United States Patent [19]

White et al.

[11] 4,324,883

[45] Apr. 13, 1982

[54] METHOD FOR MAKING POLYETHERIMIDE USING A PHENOLIC OR CARBOXYLIC ACID CATALYST

[75] Inventors: Dwain M. White, Schenectady, N.Y.; David G. Keyes, Minneapolis, Minn.

[73] Assignee: General Electric Company, Schenectady, N.Y.

[21] Appl. No.: 188,754

[22] Filed: Sep. 19, 1980

[51] Int. Cl.³ .................................. C08G 73/10
[52] U.S. Cl. ........................................ 528/207
[58] Field of Search .................... 528/12, 20, 173, 207

[56] References Cited

U.S. PATENT DOCUMENTS

| | | | |
|---|---|---|---|
| 3,847,850 | 11/1974 | Takekoshi | 528/14 |
| 3,850,885 | 11/1974 | Takekoshi et al. | 528/14 |
| 3,998,840 | 12/1976 | Williams et al. | 528/14 |
| 4,048,142 | 9/1977 | Takekoshi | 528/207 |

OTHER PUBLICATIONS

4-Dialkylaminopyridines as Highly Active Acylation Catalysts, Hofle et al., Angew. Chem. Int. Ed. Engl. 17, 569–583 (1978).
Structural Effects on the Rates of Formation of Amic Acids and Imides, Dror et al., J. Chem. Soc., Perkin II, 1425 (1974).
NASA Tech Brief, PB80-972160, ARC-11107, Improved Imide Polymerization Catalyst.
A Study of Base-Catalyzed and Salt-Catalyzed Acetylation of Hydroxyl Groups, Schenk et al., Anal. Chem., 34, 914–919, (1964).
Preparation of Acyclic Imides, Hurd et al., J. of Org. Chem., vol. 24, pp. 388–392 (1959).
Cyclization of Aromatic Polyamido Acids to Polyimides, Lavrov et al., Chemical Abstracts, vol. 87, (1977), p. 4.
A Case History of Transmuting an Idea into Money, M. Orchin., J. of Chem. Education, p. 782.
The Preparation of Phthalamic Acids and their Conversion into Anthranilic Acids, Chapman et al., J. Chem. Soc. 127, 1791 (1925).

Primary Examiner—Maurice J. Welsh
Attorney, Agent, or Firm—William A. Teoli; James C. Davis, Jr.

[57] ABSTRACT

A method is provided for making polyetherimide based on the use of an organic carboxylic acid or phenolic catalyst which is added in a controlled manner to a solution polymerization mixture of an organic dianhydride and organic diamine. An enhancement of the rate of polymerization is achieved if the catalyst addition is effected after at least a predetermined amount of water of reaction is separated from the mixture.

5 Claims, No Drawings

METHOD FOR MAKING POLYETHERIMIDE USING A PHENOLIC OR CARBOXYLIC ACID CATALYST

BACKGROUND OF THE INVENTION

The present invention relates to a method for making polyetherimides by effecting reaction between an aromatic bis(ether anhydride) and an organic diamine under solution polymerization conditions. More particularly, the present invention relates to the controlled addition of organic acid or phenol to a solution polymerization mixture for making polyetherimide.

Prior to the present invention, certain catalysts, such as sodium chloride and ferric sulfate, as shown by Williams et al, U.S. Pat. No. 3,998,840, assigned to the same assignee as the present invention, were used to enhance the rate of formation of polyetherimide under melt polymerization conditions. Although valuable results were achieved by such procedures, it was found that the aforementioned catalysts were either less effective or not effective when utilized for making polyetherimides from aromatic bis(ether anyhdride) and organic diamine under solution polymerization conditions. In addition, the presence of chloride ion may interfere with the use of such polyetherimide in electrical applications. Various metal compounds were also used to catalyze polyetherimide formation by imide-amine exchange reactions, as shown by U.S. Pat. No. 3,847,870, Takekoshi and U.S. Pat. No. 3,850,885, Takekoshi et al, assigned to the same assignee as the present invention. However, the nature of the polymerization is quite different from polyetherimide formation by the melt polymerization of aromatic bis(ether anhydride) and organic diamine, which is amine-anhydride interaction rather than imide-amine exchange.

In copending application Ser. No. 188,755, filed Sept. 19, 1980 of Tohru Takekoshi, certain oxygenated phosphorus salts were also found effective as polymerization rate enhancement catalysts for making polyimides resulting from aromatic organic dianhydride and organic diamine interaction. However, the aforementioned procedures of the prior art were based on the addition of metal salts into the polymerization mixture which resulted in the presence of metal ion residue upon the completion of such polymerization. Efforts have been made to eliminate the need for metal salt addition into organic dianhydride and organic diamine polymerization mixtures as metal ion residue often impairs the optimum properties afforded by such polyimides free of such metal ions.

STATEMENT OF THE INVENTION

The present invention is based on the discovery that enhancement of the rate of polyetherimide formation under solution polymerization conditions resulting from the interaction of organic dianhydride and organic diamine can be provided by the use of controlled addition of an organic acid, for example, acetic acid or phenol to the solution polymerization polyetherimide reaction mixture as soon as at least a critical amount of water of reaction has been removed therefrom. Although the reason why such rate enhancement of polyetherimide formation is not completely understood, one possible explanation is that the polymerization rate is initially enhanced due to the initial formation of amide acid which serves to catalyze the reaction but which starts to disappear as soon as imide radicals begin to form. The presence of a later added acidic catalyst would then serve to continue to enhance the rate of polymer formation if it is added at a critical time after the polyamide acid has been partially imidized. Surprisingly, if the added acid catalyst is introduced into the mixture too soon, the rate of reaction can actually be retarded.

There is provided by the present invention a method for enhancing the polymerization rate of polyetherimide polymerized under solution polymerization conditions which comprises (A) effecting the removal of at least about 90% by weight of water of reaction from a reaction mixture comprising an organic dianhydride of the formula,

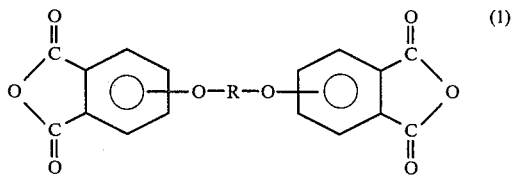

an organic diamine of the formula,

and a substantially inert organic solvent, (B) adding to the resulting mixture of (A) an effective amount of a polymerization catalyst selected from an arylhydroxide of the formula,

and a $C_{(1-20)}$ organic carboxylic acid, and (C) recovering polyetherimide from the resulting mixture of (B)

where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals and $R^2$ is a $C_{(6-13)}$ monovalent aromatic organic radical.

Radicals included by R are, for example, aromatic hydrocarbon radicals and halogenated aromatic hydrocarbon radicals, for example, phenylene, tolylene, chlorophenylene, naphthalene, etc., and radicals included by the formula,

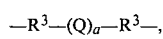

where $R^3$ is a divalent aromatic radical having 6–13 carbon atoms selected from hydrocarbon radicals and halogenated hydrocarbon radicals, and Q is a divalent organo radical selected from

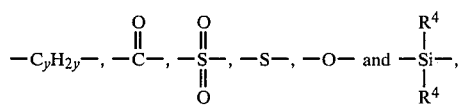

where a is 0 or 1, y is an integer having a value of from 1–5 inclusive, and $R^4$ is a monovalent hydrocarbon radical selected from methyl, phenyl, etc.

Radicals included by $R^1$ are, for example,

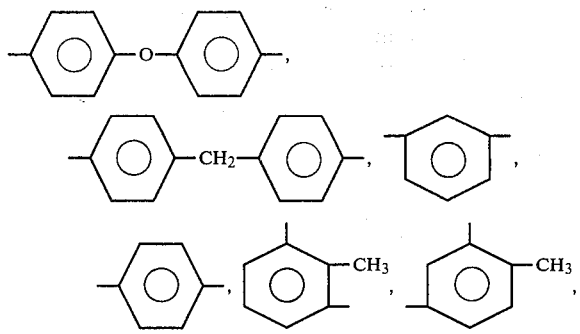

etc.; alkylene radicals such as hexamethylene, etc., cyclohexylene, $C_{(2-8)}$ alkylene terminated polydiorganosiloxane, etc.

Included by the aromatic bis(ether anhydride) of formula (1) which can be used in the practice of the present invention are, for example,

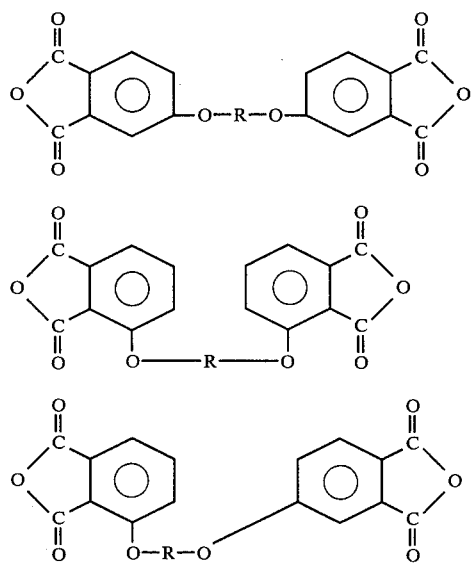

where R is as defined above.

Dianhydrides included by formula (5) are, for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenylsulfide dianhydride;
1,4-bis(2,3-dicarboxyphenoxy)benzene dianhydride;
4,4'-bis(2,3-dicarboxyphenoxy)diphenylsulfone dianhydride; etc.

Dianhydrides included by formulas (4) and (6) are, for example, 2,2-bis[4-(3,4-dicarboxyphenoxy)-phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'-(3,4-dicarboxyphenoxy)-2,2-diphenylpropane dianhydride, etc.

Included by the organic diamines of formula (2) are, for example,
m-phenylenediamine;
p-phenylenediamine;
4,4'-diaminodiphenylpropane;
4,4-diaminodiphenylmethane;
benzidine;
4,4'-diaminodiphenylsulfide;
4,4'-diaminodiphenylsulfone;
4,4'-diaminodiphenyl ether;
1,5-diaminonapthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropylsulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

$R^2$ is more particularly a monovalent radical such as phenyl, tolyl, xylyl, and halogenated derivatives thereof, for example, chlorophenyl, bromotolyl, etc.

There are included by the arylhydroxides of formula (3) phenols such as phenol, cresol, chlorophenol, bromophenol, etc.

Organic acids which can be utilized in the present invention are, for example, $C_{(1-8)}$ aliphatic carboxylic acids, such as formic acid, acetic acid, propionic acid, butanoic acid, etc.. In addition, aralkyl carboxylic acids can be used, such as phenylacetic acid, $\beta$-phenylpropionic acid, etc.

In the practice of the present invention, reaction can be effected between the organic dianhydride and the organic diamine under solution polymerization conditions at a temperature in the range of from 130° C. to 300° C. Among the organic solvents which can be employed are, for example, chlorobenzene, o-dichlorobenzene, m-dichlorobenzene, 1,2,4-trichlorobenzene, 4-chlorotoluene, 4-chloroanisole, bromobenzene, biphenyl, phenyl ether, etc. It has been found that a proportion of from 0.9 to 1.1 moles of organic diamine, per mole of organic dianhydride can be employed, while substantially equal molar amounts are preferred. The solids concentration of at least 10% by weight to 50% by weight of the reactants, based on the weight of solids and organic solvent mixture has been found to be effective. In order to determine at what point the acid catalyst should be added, which hereinafter will signify either the organic carboxylic acid, or aryl hydroxide of formula (3), the amount of water of reaction which has been formed and removed from the reaction mixture which may be in the form of an azeotrope depending upon the organic solvent utilized, should be carefully monitored. It has been found, for example, that after the reaction has proceeded for about one hour, sufficient water has been formed and separated to allow for effective results of the enhancement of the rate of polyetherimide formation. The concentration of the catalyst which has been found to be effective can vary. Experience has shown that a proportion of from about 0.2% to 5% by weight of acid catalyst, based on the weight of the polyetherimide will provide effective results, while a preferred amount is from 1.0% to 2.0%.

Upon completion of the polymerization, the resulting polyetherimide can be recovered from the mixture in accordance with standard procedures, such as precipitation of the product, filtration, centrifuging, etc. Total reaction time can vary depending upon the reactants employed, the degree of agitation utilized, the type and amount of acid catalyst added to the mixture, etc.

In order that those skilled in the art will be better able to practice the invention, the following examples are given by way of illustration and not by way of limitation. All parts are by weight.

EXAMPLE 1

A mixture of 163 parts of o-dichlorobenzene, 67.66 parts of 2,2-bis[4-(3,4-dicarboxyphenoxy)-phenyl]propane dianhydride, 13.64 parts of m-phenylenediamine and 0.712 part of aniline was stirred and heated with an oil bath at 145° C. After 5 minutes, the reaction temperature reached 120° and the precipitation of an intermediate product was noted. The rate of stirring of the mixture was increased and within 2 minutes the solids went back into solution. As the material dissolved, evolution of water was noted. The oil bath temperature was increased to 195° C. to 200° C. during the next hour.

Samples were taken from the reaction mixture after 15, 30, and 60 minutes into the reaction. During this same sequence, the weight percent water evolved from the mixture, based on the total weight of the mixture, was also recorded. At the 60 minute point, the o-dichlorobenzene had begun to reflux. Upon removal of the 60 minute sample from the mixture, 1.6 parts of glacial acetic acid was added to the reaction mixture. Additional samples were taken at intervals of 2, 4, 6, and 22 hours. Each sample was diluted with chloroform and then immediately analyzed by GPC. The remainder of each sample was diluted with chloroform and precipitated from solution by adding the solution to a 10 fold volume of methanol, followed by filtration, washing the precipitate and drying. The intrinsic viscosity of each sample was determined with and without the use of 2% by weight of acetic acid. In instances where acetic acid was used, it was added initially and 1 hour after polymerization started. The molecular weight of the resulting polyetherimide was also measured by GPC after reaction intervals of ½ hour, 1 hour, 2 hours, 4 hours, 6 hours and 22 hours with and without acetic acid catalyst. The results are shown in Table I below, where $\overline{M}w$ is the approximate molecular weight average times $10^{-3}$ and the "Water of Reaction WT%" is the theoretical weight percent of water formed during the reaction in the absence of catalyst.

TABLE I

| Reaction Time (hr) | $\overline{M}w \times 10^{-3}$ | | | Water of Reaction WT % | Isolated Polymer [n] | | |
|---|---|---|---|---|---|---|---|
| | Control | Acetic Acid 1% | 1%* | | Control | 1% | 1%* |
| 0.5 | 7 | 6 | — | 90 | 0.19 | 0.15 | 0.22 |
| 1 | 10 | 10 | 11 | 93 | 0.24 | 0.24 | 0.27 |
| 2 | 14 | 16 | 20 | 95 | 0.28 | 0.31 | 0.38 |
| 4 | 20 | 21 | 30 | 98 | 0.33 | 0.33 | 0.42 |
| 6 | 23 | 28 | 33 | 98.5 | 0.35 | 0.36 | 0.42 |
| 22 | 31 | 32 | 37 | 99 | 0.41 | 0.45 | 0.46 |

*Catalyst added 1 hr. after polymerization started.

EXAMPLE 2

The procedure of Example 1 was repeated, except that in place of acetic acid there was utilized phenol and orthochlorophenol as the polymerization acceleration catalysts:

TABLE II

| Reaction Time (hr) | [n] of isolated polymer | | | | Water of Reaction WT % |
|---|---|---|---|---|---|
| | Control | Phenol 1%* | Phenol 1%** | o-chloro Phenol 1%* | |
| 0.5 | .19 | 0.18 | .19 | — | 90 |
| 1 | .24 | .26 | .24 | .28 | 93 |
| 2 | .28 | .32 | .28 | .34 | 95 |
| 4 | .33 | .38 | .39 | .44 | 98 |
| 6 | .35 | .40 | .45 | .46 | 98.5 |
| 22 | .41 | .47 | .48 | .48 | 99 |

*catalyst added 1 hour after polymerization started
**Catalyst added 2 hours after polymerization started The above results in Table I and Table II show that significant enhancement in the rate of polymer formation can occur upon addition of catalyst after removal of at least 90% by weight of water of reaction from the reaction mixture during the solution polymerization of polyetherimide.

Although the above examples are directed to only a few of the very many variables of the method of the present invention, it should be understood that the present invention is directed to a much broader process for making polyetherimide as shown by the use of organic dianhydride of formula (1) and organic diamine of formula (2) and the carboxylic acids and phenols shown in the description preceding these examples.

What we claim as new and desire to secure by Letters Patent of the United States is:

1. A method for enhancing the polymerization rate of polyetherimide polymerized under solution polymerization conditions which comprises
   (A) effecting the removal of at least about 90% by weight of water of reaction from a reaction mixture comprising an organic dianhydride of the formula,

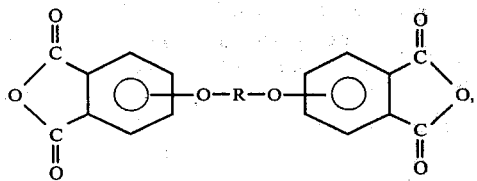

an organic diamine of the formula $NH_2R^1NH_2$, and a substantially inert organic solvent,
(B) adding to the resulting mixture of (A) an effective amount of a polymerization catalyst selected from an arylhydroxide of the formula, $R^2OH$, and a $C_{(1-20)}$ organic carboxylic acid, and
(C) recovering polyetherimide from the resulting mixture of (B),
where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals and $R^2$ is a $C_{(6-13)}$ monovalent aromatic organic radical.

2. A method in accordance with claims 1, where the polymerization catalyst is acetic acid.

3. A method in accordance with claim 1, where the polymerization catalyst is phenol.

4. A method in accordance with claim 1, where the organic dianhydride is 2,2-bis[4-(3,4-dicarboxyphenoxy)-phenyl]propane dianhydride.

5. A method in accordance with claim 1, where the organic diamine is metaphenylenediamine.

* * * * *